United States Patent [19]

Saeki et al.

[11] Patent Number: 4,460,716

[45] Date of Patent: Jul. 17, 1984

[54] COATED SAND COMPOSITION AND METHOD FOR PRODUCING SAME

[75] Inventors: Yukio Saeki; Shigeru Nemoto; Yukio Tokunaga, all of Fujieda, Japan

[73] Assignee: Sumitomo Durez Company, Ltd., Tokyo, Japan

[21] Appl. No.: 504,911

[22] Filed: Jun. 16, 1983

[30] Foreign Application Priority Data

Jun. 24, 1982 [JP] Japan .................................. 57-107587

[51] Int. Cl.³ .............................................. C08K 5/13
[52] U.S. Cl. ...................................... 523/145; 524/341
[58] Field of Search ..................... 523/145; 428/404; 524/341

[56] References Cited

U.S. PATENT DOCUMENTS

| | | | |
|---|---|---|---|
| 3,917,558 | 11/1975 | Gardikes et al. | 523/145 |
| 4,252,700 | 2/1981 | Funabiki et al. | 523/145 |
| 4,290,928 | 9/1981 | Funabiki et al. | 523/145 |
| 4,336,179 | 6/1982 | Iyer | 523/145 |
| 4,379,866 | 4/1983 | Henry et al. | 523/145 |

FOREIGN PATENT DOCUMENTS 950291  2/1964  United Kingdom ............... 523/145

Primary Examiner—Lewis T. Jacobs
Attorney, Agent, or Firm—James F. Tao; James F. Mudd

[57] ABSTRACT

A process for preparing resin coated sand for shell molding foundry operations is disclosed wherein the resin utilized is a phenolic resin containing a bromophenol. The resin coated sand has improved shake-out properties and is especially formulated for low melting metals such as aluminum and magnesium castings.

20 Claims, 1 Drawing Figure

4,460,716

COATED SAND COMPOSITION AND METHOD FOR PRODUCING SAME

BACKGROUND OF THE INVENTION

The present invention relates to an improved resin coated sand to be used in a shell-molding process. In conventional sand-molding operations, a mixture of sand coated with binder is placed in the mold, and the heat of the processing steps causes reactions to occur between the binder components to improve the pressed strength of the sand and retain the configuration of the part to be cast. After introduction of the molten metal into the cavity, the heat of the metal, during the cooling cycle is transferred to the sand-binder mixture causing the binder to be destroyed to a degree that allows the sand to be removed from the cast metal in an efficient manner.

In the automobile industry, the trend of manufacturers has led to the replacement of iron and steel castings with lighter weight metals such as aluminum, magnesium and their alloys. These castings are produced by sand-molding processes, but occur at lower temperatures than iron castings. The use of conventional binders, at these lower temperatures, have created problems in the removal of the sand particles from the castings due to the failure of the binder to be decomposed.

In the case of iron casting, the stock temperature of shell-mold reaches 800°–1000° C. at pouring, and the strength of shell-mold is naturally reduced after casting because almost all the phenolic resin binder is subjected to thermal degradation by the intense heat at pouring. Accordingly, it is easy to remove the mold-core from molded articles in the form of sand grains after casting.

For metals having a lower melting temperature, such as aluminum and magnesium, the stock temperature of shell-mold at pouring is rather low, approximately 300°–400° C. This results in an incomplete thermal degradation of the phenolic resin binder. Since conventional shell-molds have retained superfluous strength after casting for this reason, there have been extreme difficulties particularly for complicated mold structures, in removing the core efficiently from molded articles. In these cases, flogging is required so as to crush the molds even after time-consuming calcination thereof in a furnace to remove the occluded core therefrom. Flogging is a term used to indicate a tapping or impact force applied to the castings to remove the particulate sand particles leaving a clean cast structure.

After much investigation to improve the shake-out property of shell-molds after casting metals having a lower melting temperature, such as aluminum, the inventors have found that the shake-out property of cast shell molds is greatly improved by using a resin-coated sand produced by coating foundry aggregates with a phenolic resin containing a bromophenol compound.

SUMMARY OF THE INVENTION

This invention is concerned with an improved resin binder for foundry aggregates for shell molding operations, and a method of preparing a binder-aggregate composition. The phenolic resin binder is composed of a resole type phenolic resin, a novolac type phenolic resin or a mixture of the two, containing a bromophenol. The shake-out properties of the aggregate-binder composition are improved especially when using the composition for lower melting metal castings such as aluminum or magnesium.

BRIEF DESCRIPTION OF THE DRAWING

The FIGURE shows a side view of the testing device used to determine the shake-out properties of the formulation.

DETAILED DESCRIPTION OF THE INVENTION

Figure 1:
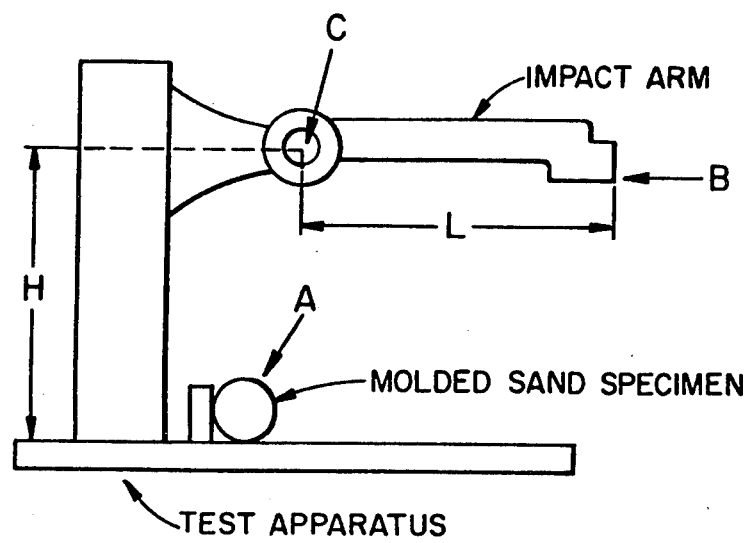

This invention relates to coated-sand composition and a method for producing same, suitable for casting metals having a lower melting temperature compared with iron, such as aluminum and magnesium. In the case of iron casting, the stock temperature of shell-mold reaches 800° to 1000° C. at pouring, and the strength of shell-mold is naturally reduced after casting because almost all the phenolic resin binder thereof is subjected to thermal degradation by the intense heat at pouring. Accordingly, it is easy to remove the mold-core from molded articles in the form of sand grains after casting. For metals having a lower melting temperature, such as aluminium and magnesium, said stock temperaure of shell-molds at pouring is rather low, 300° to 400° C. in general. This results in an incomplete thermal degradation of phenolic resin binder employed therewith. Since conventional shell-molds have retained superfluous strength after casting for this reason, there have been extreme difficulties particularly for complicated mold structures, in removing the core efficiently from molded articles. In these cases, flogging is required so as to crush the molds even after time-consuming calcination thereof in a furnace to remove the occluded core therefrom.

In order to improve the shake-out property after casting metals having a low melting temperature such as aluminum, the chemical crosslinking structure of cured phenolic resin binders must thermally be degraded and cracked. In ordinary phenolic resins said chemical crosslinking structure therein consists of such as methylene, methine and dimethylene-ether groups. Among them, the dimethylene-ether group changes by heat to a methylene group. On the other hand, both the methylene and methine groups are stable to thermal decomposition, and they require much more energy for decomposition. Accordingly, incorporating a substance, having a catalytic effect so as to lower the activation energy of decomposition reaction of methylene and methine groups, viz.; lowering the decomposition temperature of phenolic resins to 300° to 400° C., is an effective method for causing a thermal disintegration of the sand mold.

After much investigation in improving the shake-out property of shell-molds made of coated sand obtained by coating foundry aggregates with phenolic resins, the inventors hereof have found that the presence of bromophenols in phenolic resins by far improves the shake-out property of shell-mold obtained therefrom.

Said bromophenols are 2-bromophenol, 4-bromophenol, 2,4-dibromophenol, 2,3-dibromophenol, 2,5-dibromophenol, 2,6-dibromophenol, 3,5-dibromophenol, 2,4,6-tribromophenol, 2,3,5-tribromophenol, 2,4,5-tribromophenol, etc.; one or more thereof are employed in the present invention.

The most preferable incorporating proportion range of said bromophenols is 0.2 to 40 against 100 parts by weight of a phenolic resin. When the proportion range is less than 0.2 parts it is difficult to obtain an excellent shake-out property, and when the proportion range is more than 40 parts by weight, it impairs properties such as the initial strength of the mold and curing characteristics thereof.

The proper time for incorporating said bromophenols during the process of preparing phenolic resin is optional: at the beginning, during or after reacting phenols with formaldehyde. Or alternatively, after preparing said solid phenolic resin, said bromophenols are incorporated thereinto by mix-grinding or melt-mixing with a kneading machine such as an extruder. It is also possible to incorporate the bromophenols during coated sand production steps; the proper time for incorporating the bromophenols is optional: prior to, during or after adding the phenolic resin thereinto. The bromophenols are incorporated either as they are, or as dissolved in a solvent. Any incorporating method improves the shake-out property of shell-molds obtained from resin coated sand thus produced.

Phenols, as raw materials in preparing a phenolic resin hereof, are phenol, cresol, xylenol, etc., however, they are employed in the presence of resorcin, catechol, hydroquinone, urea, melamine, cashew nut shell oil.

Formaldehyde for preparing said phenolic resins is selected from formalin, paraformaldehyde, trioxane, etc. Reaction catalysts of phenol and formaldehyde for preparing novolacs are acidic substances, generally such as oxalic, hydrochloric and sulfuric acid. Basic substances are generally selected from such as ammonia, triethylamine, sodium hydroxide, barium hydroxide, etc., for resole type resin preparation.

Lubricants are preferably employed in the present invention, which are ordinary ones, however, more preferable are ethylene bis-stearic amide, methylene bis-stearic amide, oxy-stearic amide, stearic amide and methylol stearic amide. Lubricant-containing phenolic resins can be obtained by adding said lubricants to phenolic resins at any stage of their preparation; prior to, during or after the reaction.

Methods for producing coated sand in the present invention may be any of the commercial hot-coating, semi-hot-coating, cold-coating, and powder-solvent coating, however, hot-coating is preferably recommended for the present invention.

The inventors hereof will explain the present invention by the following nonlimitative Examples and Comparative Examples, wherein "parts" and "percent" indicate "parts by weight" and "percent by weight", respectively.

Preparation Example 1

To a reaction kettle with a reflux cooler and a stirrer, 1000 parts of phenol, 650 parts of 37% formalin, and 10 parts of oxalic acid were charged. The temperature of the mixture was gradually elevated. Upon reaching 96° C., reflux continued for 120 minutes. 10 parts of methylene bis-stearic amide and 100 parts of 2,4,6-tribromophenol were added thereto. After the mixture was further mixed and well dispersed, it was dehydrated under vacuum, and discharged from the kettle. Thus, 1070 parts of a lubricant-containing novolac type resin were obtained. The bromophenol content in 100 parts of the novolac type phenolic resin was 10 parts.

Preparation Example 2

Except for changing 2,4,6-tribromophenol to 2,4-dibromophenol 1070 parts of a lubricant-containing novolac type phenolic resin were obtained by the same conditions of Preparation Example 1. The content of said bromophenol in 100 parts of the novolac type phenolic resin was 10 parts.

Preparation Example 3

To a reaction kettle with a reflux cooler and a stirrer, 1000 parts of phenol, 1795 parts of 37% formalin, 160 parts of 28% aqueous ammonia solution, and 90 parts of 50% sodium hydroxide solution were charged. The temperature of the mixture was gradually elevated. Upon reaching 96° C., reflux continued for 30 minutes. 40 parts of methylene bis-stearic amide and 220 parts of 2,4,6-tribromophenol were added thereto. After the mixture was further mixed and well dispersed, it was dehydrated under vacuum. It was discharged from the kettle and chilled quickly. Thus, 1320 parts of a lubricant-containing resole type phenolic resin were obtained. The content of said bromophenol in 100 parts of the resole type phenolic resin was 20 parts.

Preparation Example 4

Except for changing 2,4,6-tribromophenol to 2,4-dibromophenol, 1320 parts of a lubricant-containing resole type phenolic resin were obtained by the same conditions of Preparation Example 3. The content of said bromophenol in 100 parts of the resole type phenolic resin was 20 parts.

Preparation Example 5

To a reaction kettle with a reflux cooler and a stirrer, 1000 parts of phenol, 650 parts of 37% formalin, and 10 parts of oxalic acid were charged. The temperature of the mixture was gradually elevated. Upon reaching 96° C., reflux continued for 30 minutes. 10 parts of methylene bis-stearic amide were added thereto. After the mixture was further mixed and well dispersed, it was dehydrated under vacuum, and discharged from the kettle. Thus, 970 parts of a lubricant-containing novolac type phenolic resin were obtained.

Preparation Example 6

Except for charging 485 parts of 2,4,6-tribromophenol at the time of charging said 10 parts of methylene bis-stearic amide thereto, 1455 parts of a lubricant-containing novolac type phenolic resin were obtained by the same conditions of Preparation Example 5. The content of said bromophenol in 100 parts of the novolac type phenolic resin was 50 parts.

Preparation Example 7

To a reaction kettle with a reflux cooler and a stirrer, 1000 parts of phenol, 1795 parts of 37% formalin, 160 parts of 28% aqueous ammonia, and 60 parts of 50% sodium hydroxide solution were charged. The temperature of the mixture was gradually elevated. Upon reaching 96° C., reflux continued for 30 minutes. 40 parts of methylene bis-stearic amide were added thereto. After the mixture was well mixed, it was discharged from the kettle and quickly chilled. Thus, 1100 parts of a lubricant-containing resole type phenolic resin was obtained.

EXAMPLE 1

Preheated at 130° to 140° C., 7000 parts of Sanei No. 6 silica sand were charged into a whirl-mixer. After 140 parts of lubricant-containing novolac type phenolic resin obtained according to Preparation Example 1 were added thereto, it was mixed for 40 seconds, and 21 parts of hexamethylene tetramine dissolved in 105 parts of water were added thereto. The mixture was further mixed until it crumbled. 7 parts of calcium stearate were added thereto, and after 30 seconds mixing, it was discharged and aerated. Thus, a kind of coated-sand composition was obtained.

EXAMPLE 2

Except for employing lubricant-containing novolac type phenolic resin obtained according to Preparation Example 2, a kind of coated-sand composition was obtained by the same conditions of Example 1.

EXAMPLE 3

Preheated at 130° to 140° C., 7000 parts of Sanei No. 6 silica sand were charged into a whirl-mixer. After 140 parts of lubricant-containing resole type phenolic resin obtained according to Preparation Example 3 were added thereto, it was mixed for 40 seconds. At this time 105 parts of cooling water were added thereto. The mixture was further mixed until it crumbled. 7 Parts of calcium stearate were added thereto and after 30 seconds mixing, it was discharged and aerated. Thus, a kind of coated-sand composition was obtained.

EXAMPLE 4

Except for employing lubricant-containing resole type phenolic resin obtained according to Preparation Example 4, a kind of coated-sand composition was obtained by the same conditions of Example 3.

EXAMPLE 5

Preheated at 130° to 140° C., 7000 parts of Sanei No. 6 silica sand were charged into a whirl-mixer and successively 130 parts of lubricant-containing novolac type phenolic resin obtained according to Preparation Example 5 were added thereto. Followed by 20 seconds mixing, 13 parts of 2,4,6-tribromophenol were added thereto. After it was mixed for 20 seconds, 21 parts of hexamethylene tetramine dissolved in 105 parts of water were added thereto. The mixture was further mixed until it crumbled. 7 Parts of calcium stearate were added thereto, followed by 30 seconds mixing, it was discharged and aerated. Thus, a kind of coated-sand composition was obtained.

EXAMPLE 6

Preheated at 130° to 140° C., 7000 parts of Sanei No. 6 silica sand were charged into a whirl-mixer. After 13 parts of 2,4,6-tribromophenol were added thereto, it was mixed for 20 seconds. Successively 78 parts of lubricant-containing novolac type phenolic resin according to Preparation Example 5 and 52 parts of lubricant-containing resole type phenolic resin according to Preparation Example 7 were added thereto, and the mixture was mixed well for 20 seconds. At this time 13 parts of hexamethylene tetramine dissolved in 63 parts by weight of water were added thereto. The mixture was mixed until it crumbled. 7 parts of calcium stearate were added thereto, and after 30 seconds mixing, it was discharged and aerated. Thus, a kind of coated-sand composition was obtained.

COMPARATIVE EXAMPLE 1

Preheated at 130° to 140° C., 7000 parts of Sanei No. 6 silica sand were charged into a whirl-mixer. After 140 parts of novolac type phenolic resin obtained according to Preparation Example 5 were added thereto, it was mixed for 40 seconds, and 21 parts of hexamethylene tetramine dissolved in 105 parts of water were added thereto. The mixture was mixed until it crumbled. 7 parts of calcium stearate were added thereto, and after 30 seconds mixing, it was discharged and aerated. Thus, a kind of coated-sand composition was obtained.

COMPARATIVE EXAMPLE 2

Except for employing lubricant-containing novolac type phenolic resin obtained according to Preparation Example 6, a kind of coated-sand composition was obtained by the same method and conditions of Comparative Example 1.

COMPARATIVE EXAMPLE 3

Preheated at 130° to 140° C., 7000 parts of Sanei No. 6 silica sand were charged into a whirl-mixer. After 140 parts of resole type phenolic resin obtained according to Preparation Example 7 were added thereto, it was mixed for 40 seconds, and 105 parts of water were added thereto. The mixture was mixed until it crumbled. 7 parts of calcium stearate were added thereto, and after 30 seconds mixing, it was discharged and aerated. Thus, a kind of coated-sand composition was obtained.

Table 1 indicates the characteristics of various kinds of coated-sand composition obtained according to Examples 1, 2, 3, 4, 5, and 6 and Comparative Examples 1, 2, and 3 as well as the shake-out property of shell-molds therefrom.

TABLE 1

| | | | Example | | | | | | Comparative Example | | |
|---|---|---|---|---|---|---|---|---|---|---|---|
| | | | 1 | 2 | 3 | 4 | 5 | 6 | 1 | 2 | 3 |
| No. of employed Preparation Example | | | 1 | 2 | 3 | 4 | 5 | 5 + 7 | 5 | 6 | 7 |
| Kind of bromophenols | | | 2,4,6-tribromophenol | 2,4-dibromophenol | 2,4,6-tribromophenol | 2,4-dibromophenol | 2,4,6-tribromophenol | 2,4,6-tribromophenol | — | 2,4,6-tribromophenol | — |
| Incorporating proportion of bromophenols to 100 parts of phenolic resin | | | 10 | 10 | 20 | 20 | 10 | 10 | 0 | 50 | 0 |
| Coated sand | Stick point (°C.) | | 100 | 99 | 95 | 93 | 100 | 97 | 102 | 95 | 98 |
| Shell-mold | Bending strength (kg/cm$^2$) | | 30.0 | 29.6 | 26.8 | 25.9 | 30.1 | 29.3 | 31.0 | 14.5 | 29.0 |
| | Tensile strength under heat (kg/cm$^2$) | 30 sec. | 2.5 | 2.6 | 1.6 | 1.5 | 2.5 | 2.2 | 2.5 | 1.0 | 2.0 |
| | | 45 sec. | 5.0 | 4.9 | 2.9 | 3.0 | 4.8 | 4.1 | 5.1 | 2.3 | 3.0 |
| | | 60 sec. | 8.0 | 7.9 | 6.3 | 6.2 | 7.9 | 7.4 | 8.2 | 2.6 | 6.5 |

TABLE 1-continued

| | Example | | | | | | Comparative Example | | |
|---|---|---|---|---|---|---|---|---|---|
| | 1 | 2 | 3 | 4 | 5 | 6 | 1 | 2 | 3 |
| at 250° C. Shake-out property (times) | 14 | 14 | 9 | 9 | 13 | 12 | 31 | 5 | 28 |

Procedures used for testing of samples in Table 1.
Bending strength: according to JACT Method SM-1
Stick point: according to JACT Method C-1
Tensile strength under elevated temperature: according to JACT Method SM-10
Shake-out property:
  Preparation of specimen: Coated sand is fed into an iron pipe of 29 mm in diameter and 150 mm length. After 30 minutes baking, it is covered with aluminum foil and further heated for 3 hours at 370° C. After cooling, the sand molded pipe is removed.
  Test method: The specimen is flogged by the impact arm of the apparatus illustrated in FIG. 1. Crumbled sand is removed from the pipe after each flogging. Weighing the residual molded sand of the specimen until it becomes zero, and the shake-out property is defined by the number of floggings required.
  Test apparatus: In FIG. 1, A is a molded sand specimen and B is the arm which revolves around pivot C set at 30 cm high. Said arm is at first set horizontally, and then allowed to drop so as to flog the specimen.

We claim:

1. A resin coated sand for shell molding foundry applications comprising foundry aggregates coated with a phenolic resin containing bromophenols, wherein the incorporating proportion range of bromophenols to 100 parts by weight phenolic resin is from about 0.2 to about 40 parts by weight.

2. A resin coated sand according to claim 1, wherein the bromophenol is 2,4,6-tribromophenol.

3. A resin coated sand according to claim 1, wherein the phenolic resin is a novolac phenolic resin.

4. A resin coated sand according to claim 1, wherein the phenolic resin is a resole phenolic resin.

5. A resin coated sand according to claim 1, wherein the phenolic resin is a mixture of novolac and resole phenolic resins.

6. A resin coated sand according to claim 1, wherein a lubricant is additionally added to the phenolic resin.

7. A resin coated sand according to claim 3, wherein a lubricant is additionally added to the phenolic resin.

8. A resin coated sand according to claim 4, wherein a lubricant is additionally added to the phenolic resin.

9. A resin coated sand according to claim 5, wherein a lubricant is additionally added to the phenolic resin.

10. A resin coated sand for shell molding foundry applications comprising foundry aggregates coated with a phenolic resin containing a lubricant and from about 0.2 to about 40 parts 2,4,6-tribromophenol per 100 parts phenolic resin.

11. A method for producing resin coated sand for shell molding foundry operations having improved shake-out properties comprising coated foundry aggregates with phenolic resin containing bromophenols, wherein the incorporating proportion range of bromophenols to 100 parts by weight phenolic resin resin is from about 0.2 to about 40 parts by weight.

12. A method for producing resin coated sand according to claim 11, wherein the bromophenol is 2,4,6-tribromophenol.

13. A method for producing resin coated sand according to claim 11, wherein the phenolic resin is a novolac phenolc resin.

14. A method for producing resin coated sand according to claim 11, wherein the phenolic resin is a resole phenolic resin.

15. A method for producing resin coated sand according to claim 11, wherein the phenolic resin is a mixture of novolac and resole phenolic resins.

16. A method for producing resin coated sand according to claim 11, wherein a lubricant is added to the phenolic resin.

17. A method for preparing resin coated sand according to claim 13, wherein a lubricant is added to the phenolic resin.

18. A method for preparing resin coated sand according to claim 14, wherein a lubricant is added to the phenolic resin.

19. A method for preparing resin coated sand according to claim 15, wherein a lubricant is added to the phenolic resin.

20. A method for producing resin coated sand for shell molding foundry operations having improved shake-out properties comprising coating foundry aggregates with phenolic resin containing a lubricant and from about 0.2 to about 40 parts 2,4,6-tribromophenol per 100 parts phenolic resin.

* * * * *